(12) United States Patent
Park et al.

(10) Patent No.: US 8,856,876 B2
(45) Date of Patent: Oct. 7, 2014

(54) APPARATUS AND METHOD FOR IDENTIFYING WIRELESS NETWORK PROVIDER IN WIRELESS COMMUNICATION SYSTEM

(71) Applicant: Samsung Electronics Co., Ltd, Gyeonggi-do (KR)

(72) Inventors: Woo-Jin Park, Gyeonggi-do (KR); Jae-Eun Kang, Gyeonggi-do (KR); Hyo-Sun Shim, Gyeonggi-do (KR); Jin-Wook Lee, Gyeonggi-do (KR); Chang-Hyun Lee, Gyeonggi-do (KR); Seong-Wook Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/681,349

(22) Filed: Nov. 19, 2012

(65) Prior Publication Data

US 2013/0152167 A1    Jun. 13, 2013

(30) Foreign Application Priority Data

Dec. 13, 2011 (KR) ........................ 10-2011-0133701

(51) Int. Cl.
| | |
|---|---|
| G06F 7/04 | (2006.01) |
| H04L 29/06 | (2006.01) |
| H04W 12/12 | (2009.01) |
| H04W 12/00 | (2009.01) |
| H04W 12/04 | (2009.01) |

(52) U.S. Cl.
CPC .............. *H04W 12/00* (2013.01); *H04W 12/12* (2013.01); *H04L 63/126* (2013.01); *H04W 12/04* (2013.01)

USPC ................................................ 726/3; 713/163

(58) Field of Classification Search
CPC ....... H04L 63/08; H04L 63/083; H04L 63/10; H04L 63/0815; H04L 63/0823; H04L 63/20; H04L 29/06; H04L 63/0428; G06F 21/6218; G06F 21/31
USPC ........ 726/2, 3, 4, 5, 2.3, 13, 14; 713/163, 181
See application file for complete search history.

(56) References Cited

U.S. PATENT DOCUMENTS

| | | | | |
|---|---|---|---|---|
| 6,658,004 | B1 * | 12/2003 | Kadansky et al. | 370/394 |
| 7,181,530 | B1 * | 2/2007 | Halasz et al. | 709/238 |
| 7,200,112 | B2 * | 4/2007 | Sundar et al. | 370/230 |
| 7,224,970 | B2 * | 5/2007 | Smith et al. | 455/434 |

(Continued)

FOREIGN PATENT DOCUMENTS

KR    10-2006-0047267          5/2006

OTHER PUBLICATIONS

International Search Report dated Mar. 20, 2013 in connection with International Application No. PCT/KR2012/009336, 3 pages.

(Continued)

*Primary Examiner* — Farid Homayounmehr
*Assistant Examiner* — Abu Sholeman

(57) ABSTRACT

To check security of an Access Point (AP) in a wireless communication system, an operating method of a terminal includes, before completing connection to the AP, receiving a frame that informs the terminal of existence of the AP; extracting security test information from the frame; and testing the security of the AP using the security test information.

20 Claims, 7 Drawing Sheets

(56) References Cited

U.S. PATENT DOCUMENTS

| | | |
|---|---|---|
| 7,236,460 B2 * | 6/2007 | Wu et al. .................. 370/241 |
| 7,257,107 B2 * | 8/2007 | Swier et al. ............... 370/338 |
| 7,316,031 B2 * | 1/2008 | Griffith et al. ............. 726/22 |
| 7,350,077 B2 * | 3/2008 | Meier et al. ............... 713/171 |
| 7,392,037 B2 * | 6/2008 | Qi et al. ..................... 455/410 |
| 7,403,774 B2 * | 7/2008 | Chandra et al. ........... 455/432.1 |
| 7,480,939 B1 * | 1/2009 | Nessett et al. ............. 726/22 |
| 7,558,960 B2 * | 7/2009 | Cam Winget et al. .... 713/176 |
| 7,702,775 B2 * | 4/2010 | Kuan et al. ................ 709/224 |
| 7,743,408 B2 * | 6/2010 | Aboba et al. .............. 726/4 |
| 7,783,756 B2 * | 8/2010 | Choyi et al. ............... 709/225 |
| 7,882,349 B2 * | 2/2011 | Cam-Winget et al. .... 713/160 |
| 7,885,639 B1 * | 2/2011 | Satish et al. ............... 455/410 |
| 7,995,924 B2 * | 8/2011 | Lee et al. ................... 398/102 |
| 8,001,381 B2 * | 8/2011 | Metke et al. .............. 713/169 |
| 8,069,483 B1 * | 11/2011 | Matlock ..................... 726/23 |
| 8,176,328 B2 * | 5/2012 | Chen et al. ................. 713/176 |
| 8,195,935 B2 * | 6/2012 | Tian et al. .................. 713/158 |
| 8,254,498 B1 * | 8/2012 | Myers et al. ............... 375/316 |
| 8,270,607 B2 * | 9/2012 | Kim et al. .................. 380/258 |
| 8,320,350 B2 * | 11/2012 | Messerges et al. ........ 370/341 |
| 8,370,920 B2 * | 2/2013 | Garrard et al. ............ 726/14 |
| 8,494,164 B2 * | 7/2013 | Kweon et al. ............. 380/270 |
| 8,576,760 B2 * | 11/2013 | Gorokhov et al. ......... 370/311 |
| 2002/0093929 A1 * | 7/2002 | Mangold et al. ........... 370/336 |
| 2004/0243846 A1 * | 12/2004 | Aboba et al. .............. 713/201 |
| 2005/0238172 A1 | 10/2005 | Tamura |
| 2005/0268091 A1 * | 12/2005 | Renganarayanan et al. .. 713/163 |
| 2006/0092883 A1 * | 5/2006 | Lee et al. ................... 370/332 |
| 2006/0274643 A1 * | 12/2006 | Choyi et al. ............... 370/216 |
| 2007/0218875 A1 * | 9/2007 | Calhoun et al. ........... 455/411 |
| 2008/0159535 A1 * | 7/2008 | Kim et al. .................. 380/258 |
| 2008/0250498 A1 * | 10/2008 | Butti et al. ................. 726/23 |
| 2008/0295144 A1 * | 11/2008 | Cam-Winget et al. ..... 726/1 |
| 2009/0010191 A1 * | 1/2009 | Wentink ..................... 370/311 |
| 2009/0080389 A1 * | 3/2009 | Messerges et al. ........ 370/338 |
| 2009/0307484 A1 | 12/2009 | Zhang et al. |
| 2009/0327736 A1 * | 12/2009 | Cam-Winget et al. .... 713/181 |
| 2010/0020746 A1 | 1/2010 | Zaks |
| 2010/0070771 A1 * | 3/2010 | Chen et al. ................. 713/176 |
| 2010/0211790 A1 * | 8/2010 | Zhang ......................... 713/171 |
| 2010/0328032 A1 | 12/2010 | Rofougaran |
| 2011/0078793 A1 * | 3/2011 | Orgill ......................... 726/23 |
| 2011/0083165 A1 * | 4/2011 | Gopinath et al. .......... 726/4 |
| 2011/0131468 A1 * | 6/2011 | Myers et al. ............... 714/758 |
| 2012/0210395 A1 * | 8/2012 | Cam Winget et al. ..... 726/3 |
| 2012/0284517 A1 * | 11/2012 | Lambert ..................... 713/169 |
| 2013/0007495 A1 * | 1/2013 | Maciocco et al. ......... 713/323 |
| 2013/0007837 A1 * | 1/2013 | King ........................... 726/1 |
| 2013/0021949 A1 * | 1/2013 | Kaal ........................... 370/255 |
| 2013/0090115 A1 * | 4/2013 | Deivasigamani et al. ... 455/434 |
| 2013/0152167 A1 * | 6/2013 | Park et al. .................. 726/3 |
| 2013/0219485 A1 * | 8/2013 | Garrard et al. ............ 726/14 |
| 2013/0235859 A1 * | 9/2013 | Sun et al. ................... 370/338 |
| 2013/0279381 A1 * | 10/2013 | Sampath et al. ........... 370/311 |
| 2013/0282579 A1 * | 10/2013 | Palnitkar et al. .......... 705/44 |
| 2013/0310064 A1 * | 11/2013 | Brachet et al. ............ 455/456.1 |

OTHER PUBLICATIONS

Written Opinion of the International Searching Authority dated Mar. 20, 2013 in connection with International Application No. PCT/KR2012/009336, 4 pages.

* cited by examiner

APPARATUS AND METHOD FOR IDENTIFYING WIRELESS NETWORK PROVIDER IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Dec. 13, 2011, and assigned Serial No. 10-2011-0133701, the entire disclosure of which is hereby incorporated by reference.

TECHNICAL FIELD OF THE INVENTION

The present disclosure relates generally to wireless communication systems.

BACKGROUND OF THE INVENTION

Wireless Local Area Network (LAN) provides connection using radio frequencies, unlike wired LAN for communication using a cable. The wireless LAN can be configured using an Access Point (AP) that provides wireless access. The AP configures one wireless LAN by setting a frequency band, a Service Set IDentifier (SSID), and a security scheme. The AP is given the same wireless LAN name as the SSID and informs adjacent terminals of its information, including the SSID, by periodically sending a predefined signal. The terminals can be referred to as stations.

To access a particular wireless LAN, a terminal searches for adjacent APs through a scanning procedure. According to the search, the terminal can select and access one AP. In so doing, when a security mode of the AP is not open, input of a security password is requested. The security password is defined by the selected AP according to the corresponding security scheme. When the security mode of the AP is open, the terminals can access the AP without inputting the security password.

A malicious AP owner may let the terminals easily access and obtain every data transmitted and received by the connected terminals by setting the security mode of the AP to open. That is, since all data transmitted and received by the terminals over a core network passes through the AP, the AP can acquire all the data. When the SSID of a well-known wireless network service provider is pirated, such a problem can be aggravated.

SUMMARY OF THE INVENTION

To address the above-discussed deficiencies of the prior art, it is an aspect of the present disclosure to provide an apparatus and a method for identifying an Access Point (AP) that steals a network name in a wireless communication system.

Another aspect of the present disclosure is to provide an apparatus and a method for identifying an AP that rightfully sets a network name in a wireless communication system.

Yet another aspect of the present disclosure is to provide an apparatus and a method for a wireless network service provider to inform terminals of the safety of its network in a wireless communication system.

Still another aspect of the present disclosure is to provide an apparatus and a method for determining whether it is safe to connect to a wireless network before making the connection in a wireless communication system.

According to one aspect of the present disclosure, an operating method of a terminal in a wireless communication system includes, before completing connection to an AP, receiving a frame that informs the terminal of the existence of the AP; extracting security test information from the frame; and testing the security of the AP using the security test information.

According to another aspect of the present disclosure, an operating method of an AP in a wireless communication system includes determining whether to transmit a frame informing terminals of the existence of the AP; generating security test information for the AP; generating a frame comprising the security test information; and transmitting the frame.

According to yet another aspect of the present disclosure, an apparatus of a terminal in a wireless communication system includes a communication unit for, before completing connection to an AP, receiving a frame that informs the terminal of the existence of the AP; and a controller for extracting security test information from the frame and testing the security of the AP using the security test information.

According to still another aspect of the present disclosure, an apparatus of an AP in a wireless communication system includes a controller for determining whether to transmit a frame informing terminals of the existence of the AP, generating security test information for the AP, and generating a frame comprising the security test information; and a communication unit for transmitting the frame.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present disclosure provide a technique for identifying an Access Point (AP) that steals a network name in a wireless communication system. Hereinafter, to ease understanding, the present disclosure employs, but is not limited to, terms defined in the Institute of Electrical and Electronics Engineers (IEEE) 802.11 standard. Thus, the present disclosure is equally applicable to other standard systems.

In general, a terminal completes wireless Local Area Network (LAN) connection via the AP as follows. First, the terminal searches for its adjacent APs through a scanning procedure. Upon detecting one or more APs, the terminal displays an AP list to a user through a display means. When the user selects any one AP, the terminal accesses the selected AP. When the selected AP sets a security password, the terminal displays a screen requesting that the user input the security password. When the correct password is input, the wireless LAN connection is successfully completed. By contrast, when the security setting of the selected AP is open, the password input is omitted.

In so doing, as it is searching for the adjacent APs, the terminal receives frames from the adjacent APs. The frames can be a kind of a management frame. The frames are transmitted to the terminal to inform the terminal of the existence of the AP and include information such as a Service Set IDentifier (SSID) and a security scheme. The AP can transmit the frames on a periodic basis or according to a request of the terminal. For example, a frame can be referred to as a beacon frame or a probe response frame. The beacon frame is periodically transmitted by the AP without the request of the terminal, and the probe response frame is transmitted when a probe request frame is received from the terminal.

According to an exemplary embodiment of the present disclosure, the frame includes information for checking security. Herein, the security ensures that the corresponding AP uses the rightful network name. In other words, the security implies that the person who installs the corresponding AP is the same as the wireless network provider of the network name set in the corresponding AP.

Figure 1:
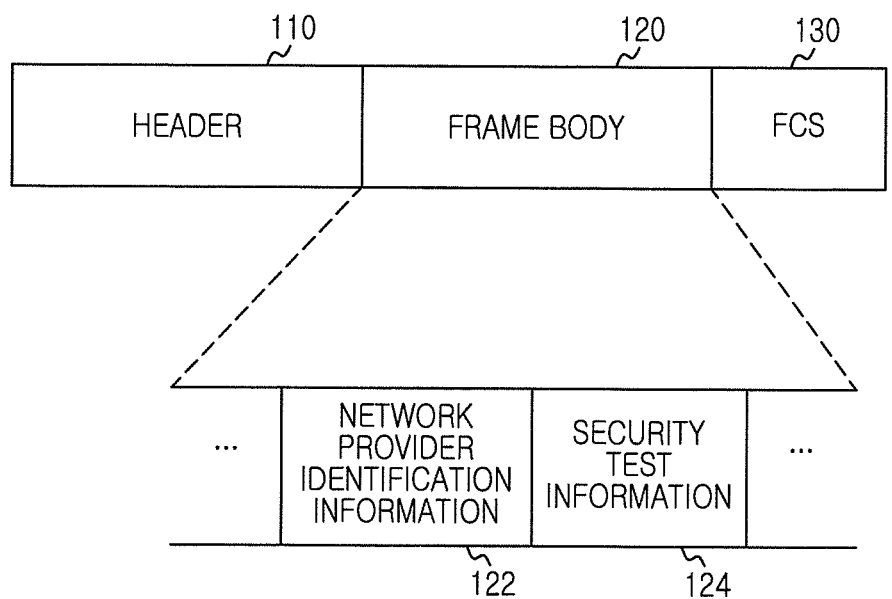
FIG. 1 illustrates a management frame in a wireless communication system according to an exemplary embodiment of the present disclosure.

FIG. 1 depicts a management frame in a wireless communication system according to an exemplary embodiment of the present disclosure. As shown in FIG. 1, the management frame includes a header 110, a frame body 120, and a Frame Checking Sequence (FCS) 130. The frame header 110 can include at least one of a frame control, a duration indicating the time duration of the current transmission, a Destination Address (DA) indicating a destination of the frame, a Source Address (SA) indicating a source of the frame, a Basic Service Set ID (BSSID) indicating an address of the AP in a BSS, a sequence number of the frame, and a sequence control indicating fragmentation number. The FCS 130 can be Cyclic Redundancy Check (CRC) bits. The frame body 120 contains AP information.

According to an exemplary embodiment of the present disclosure, the frame body 120 includes network provider identification information 122 and security test information 124. The network provider identification information 122 is an identifier of a service provider that provides the wireless access service via the AP and can be referred to as an organization identifier. The security test information 124, which is provided in a security related information field of the frame body 120, is information provided to the terminal to determine whether the corresponding AP is safe and can be referred to as organization security. The network provider identification information 122 and the security test information 124 can be included in a vendor-specific Information Element (IE). Alternatively, the network provider identification information 122 and the security test information 124 can be included as a separate IE defined for the security test. Alternatively, the network provider identification information 122 can be excluded.

The frame including the network provider identification information 122 and the security test information 124 can be transmitted in the AP search procedure before the terminal completes the connection to the AP. The AP search procedure can be carried out by exchanging signals as shown in FIG. 2.

Figure 2:
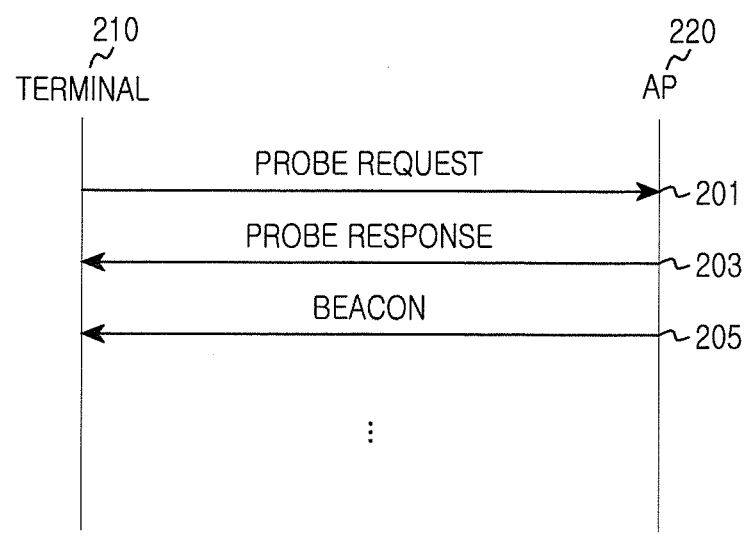
FIG. 2 illustrates an Access Point (AP) search in the wireless communication system according to an exemplary embodiment of the present disclosure.

FIG. 2 depicts the signal exchange for the AP search in the wireless communication system according to an exemplary embodiment of the present disclosure. Referring to FIG. 2, a terminal 210 transmits a probe request frame to acquire information of adjacent APs in step 201. In step 203, an AP 220 receiving the probe request frame transmits a probe response frame. Herein, the probe response frame can include at least one of the network provider identification information 122 and the security test information 124 of FIG. 1. Apart from the reception of the probe request frame, the AP 220 periodically transmits the beacon frame in step 205. For example, the AP 220 can broadcast the beacon frame at intervals of 100 ms. Herein, the beacon frame can include at least one of the network provider identification information 122 and the security test information 124 of FIG. 1. That is, the terminal can verify that the corresponding AP is safe by receiving the beacon frame or the probe response from the AP before the wireless LAN connection.

The security can be checked as follows.

The security test information 124 is generated in a manner prearranged between the AP and the terminal. Accordingly, by determining that the frame received from the AP includes the security test information 124, the terminal can verify the rightful AP. The security test information 124 can be defined in various forms according to specific implementations. For example, the security test information 124 can be an encrypted value based on a digital signature scheme, or a hash value.

When the digital signature is applied, the AP uses predefined particular information encrypted with a private key as the security test information 124. In other words, the AP includes the particular information encrypted with the private key in the frame. That is, the AP transmits the beacon frame and the probe response frame containing the particular information encrypted with the private key in a security related information field, such as the security test information 124 of FIG. 1. The particular information can vary in various embodiments of the present disclosure. For example, the particular information can include the BSSID. Hence, the terminal decrypts the encrypted value with a pre-obtained public key and determines the security is ensured when the BSSID is acquired from the decryption.

When the hash value is used, the AP and the terminal share a common private key. The AP generates the hash value using a current system time value and a random value and uses the hash value as the security test information 124. That is, the AP transmits the beacon frame and the probe response frame containing the hash value in the security related information field. The terminal generates the hash value in the same manner and compares the generated hash value and the hash value contained in the security related information field of the beacon frame and the probe response frame. When the two hash values are the same, the terminal determines the security is ensured. Alternatively, the terminal can verify the security of only the AP which transmits the same hash value within a valid time starting from the time indicated by the system time value. Alternatively, the terminal can verify the security of only the first AP that transmits the same hash value.

For the digital signature, the terminal obtains the public key. For the hash value, the terminal and the AP obtain the current system time value and the random value. According to an exemplary embodiment, the public key, the system time value, and the random value can be stored in the manufacture phase of the terminal and the AP. Alternatively, the public key, the system time value, and the random value can be provided from the wireless network provider during operation of the terminal and the AP. Alternatively, part of the public key, the system time value, and the random value can be stored in the manufacture phase and the rest can be provided from the wireless network provider during operation.

Figure 3:
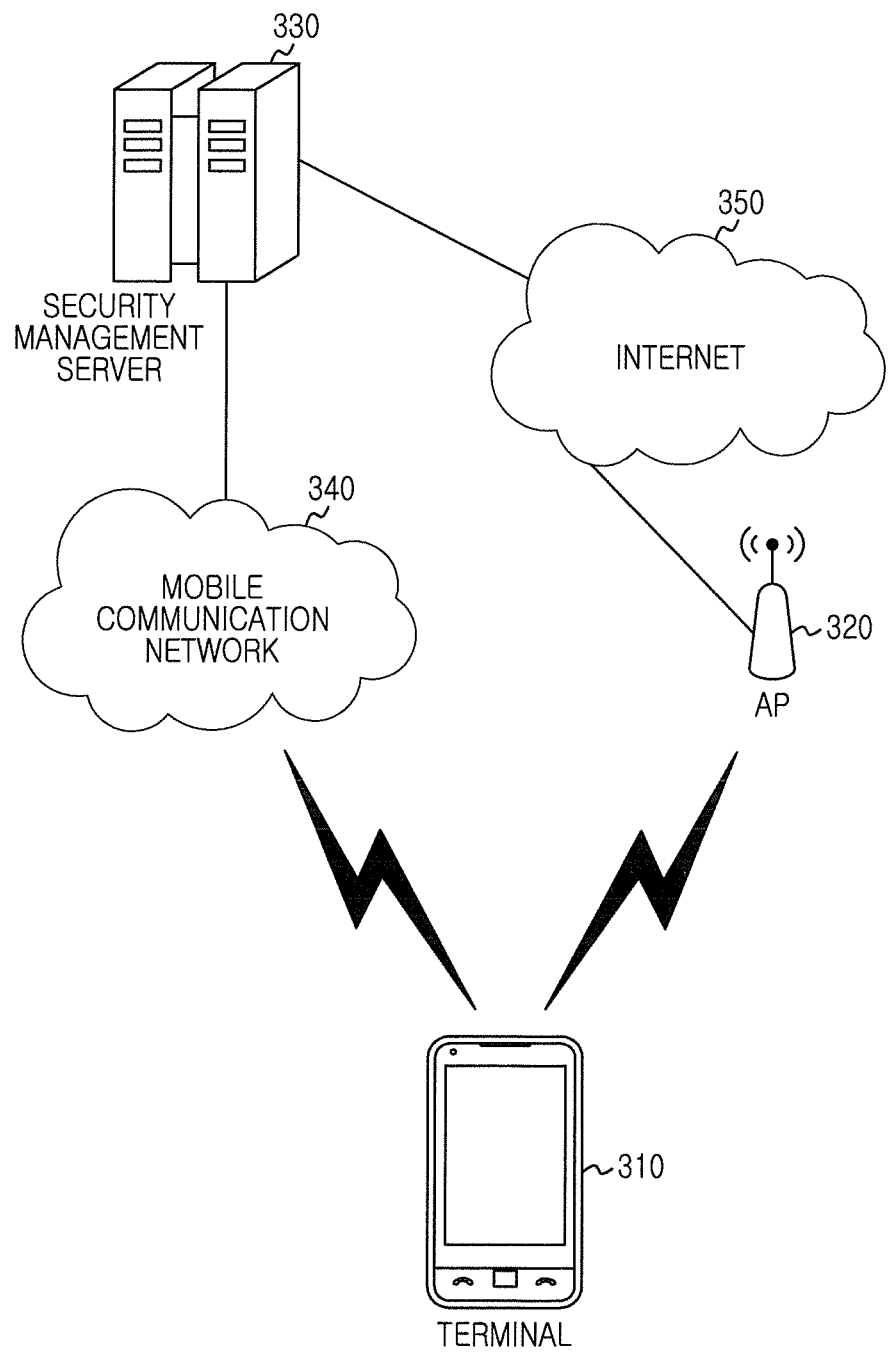
FIG. 3 illustrates entities in the wireless communication system according to an exemplary embodiment of the present disclosure.

The information is provided during operation of the terminal and the AP as follows. FIG. 3 depicts entities in the wireless communication system according to an exemplary embodiment of the present disclosure. The information used for the security test during operation can be provided when the wireless network provider possesses a mobile communication network.

Referring to FIG. 3, the system includes a terminal 310, an AP 320, and a security management server 330. The terminal 310 can access the AP 320 and access a mobile communication network 340. The security management server 330, which is the entity managed by the wireless network provider, controls the setting of the AP 320 or the setting of the mobile communication network 340. The security management server 330 can provide the AP 320 and the terminal 310 with at least one of the public key, the system time value, and the random value. In so doing, the information can be transmitted to the AP 320 over the Internet network 350, and the information can be transmitted to the terminal 310 over the mobile communication network 340.

More specifically, according to the digital signature scheme, the security management server 330 transmits the public key to a plurality of terminals, including the terminal 310, over the mobile communication network 340. For example, the public key can be transmitted over a broadcast channel of the mobile communication system. The public key can be transmitted over the mobile communication network 340 when the public key is changed or periodically at regular time intervals.

According to the hash scheme, the security management server 330 transmits the system time value and the random value to the plurality of terminals, including the terminal 310, over the mobile communication network 340 and transmits the system time value and the random value to a plurality of APs, including the AP 320, over the Internet network 350. For example, the system time value and the random value can be transmitted over the broadcast channel of the mobile communication system.

Alternatively, the information used for the security test can be provided using a Radio Frequency IDentification (RFID) tag, such as Near Field Communication (NFC).

Now, operations and structures of the AP and the terminal for checking the security as stated above are elucidated by referring to the drawings.

Figure 4:
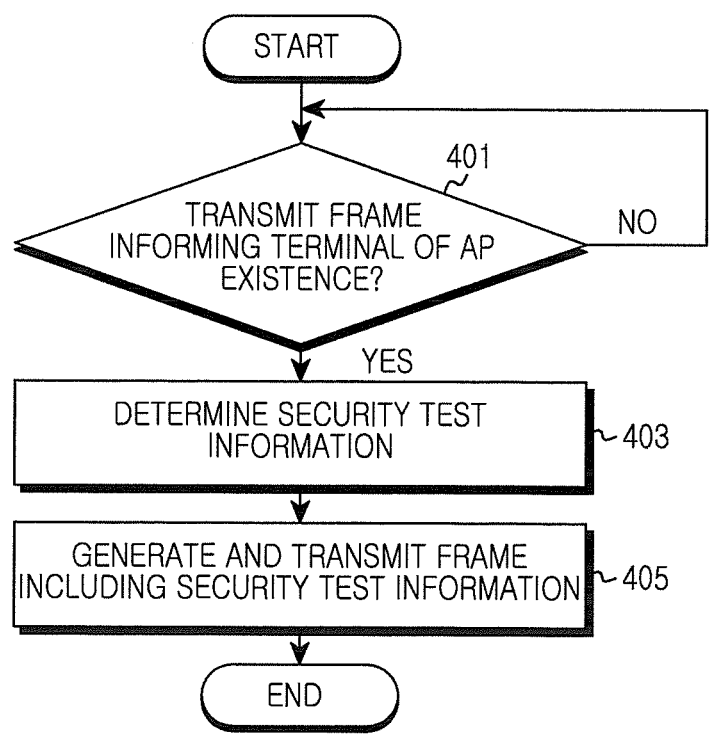
FIG. 4 illustrates operations of an AP in the wireless communication system according to an exemplary embodiment of the present disclosure.

FIG. 4 depicts operations of the AP in the wireless communication system according to an exemplary embodiment of the present disclosure.

Referring to FIG. 4, the AP determines whether to transmit a frame informing a terminal of its existence in step 401. The frame informing a terminal of the existence of the AP enables the terminal to obtain basic information for use in accessing the AP through the scanning procedure and indicates that the frame is receivable before the terminal completes its connection to the AP. For example, the basic information includes the SSID and the security scheme. For example, the frame informing the terminal of the AP existence includes the beacon frame and the probe response frame. The beacon frame is periodically transmitted. Hence, when the transmission cycle of the beacon frame arrives, the AP determines to transmit the frame informing a terminal of its existence. The probe response frame is transmitted when a probe request frame is received from a terminal. Thus, upon receiving the probe request frame, the AP determines to transmit the frame informing the terminal of its existence.

When determining to transmit the frame informing a terminal of the AP existence, the AP determines security test information 124 in step 403. The security test information 124 indicates the value contained in the security related information field of FIG. 1. For example, the security test information 124 can be one of an encrypted value of particular information (e.g., BSSID) and a hash value generated from an input parameter (e.g., the system time and/or the random value) fed from the wireless network provider. When the security test information 124 is the encrypted value of the particular information, the AP encrypts the particular information using a predefined private key. When the security test information 124 is the hash value, the AP receives the input parameter from a separate server and generates the hash value from the input parameter.

In step 405, the AP generates and transmits the frame including the security test information 124. For example, the frame can be one of the beacon frame and the probe response frame. According to an exemplary embodiment, the security test information 124 can be included in the vendor-specific IE of the frame body. Alternatively, the security test information 124 can be included as a separate IE defined for the security test. In addition to the security test information 124, the network provider identification information 122 can be included.

Figure 5:
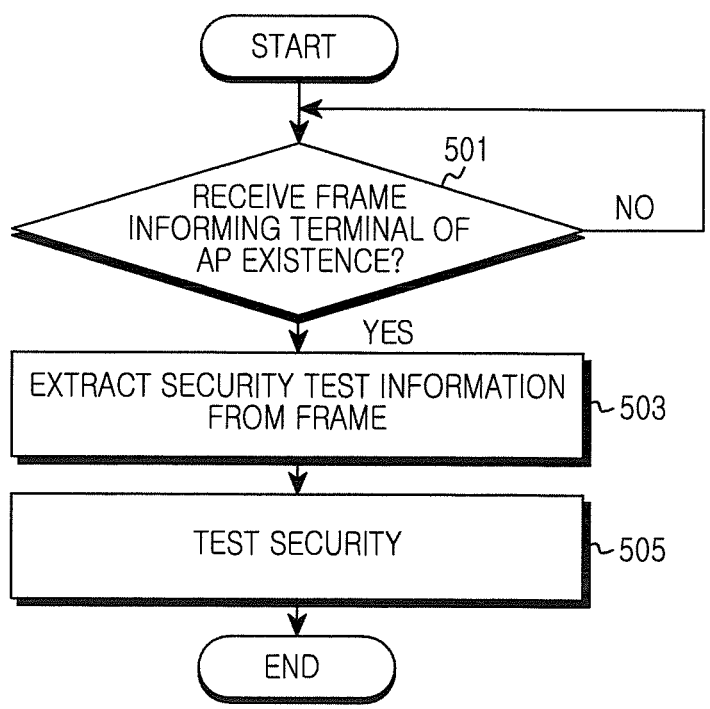
FIG. 5 illustrates operations of a terminal in the wireless communication system according to an exemplary embodiment of the present disclosure.

FIG. 5 depicts operations of the terminal in the wireless communication system according to an exemplary embodiment of the present disclosure.

Referring to FIG. 5, the terminal determines whether a frame informing the terminal of the existence of an AP is received in step 501. The frame informing the terminal of the existence of the AP enables the terminal to obtain the basic information used for accessing the AP through the scanning procedure and indicates that the frame is receivable before the terminal completes its connection to the AP. For example, the basic information includes the SSID and the security scheme. For example, the frame informing the terminal of the AP existence includes the beacon frame and the probe response frame.

Upon receiving the frame informing the terminal of the AP existence, the terminal extracts the security test information 124 from the received frame in step 503. The security test information 124 indicates the value contained in the security related information field of FIG. 1. For example, the security test information 124 can be one of the encrypted value of the particular information (e.g., BSSID) and the hash value generated from the input parameter (e.g., the system time and/or the random value) fed from the wireless network provider. According to an exemplary embodiment, the security test information 124 can be included in the vendor-specific IE of the frame body. Alternatively, the security test information 124 can be included as a separate IE defined for the security test. The terminal can extract the security test information 124 from the vendor-specific IE or the separate IE.

In step 505, the terminal checks the security using the security test information 124. To check the security, the terminal acquires additional reference information in addition to the security test information 124. The reference information can be stored in the manufacture phase of the terminal or received from the wireless network provider during operation. The reference information varies according to the type of the security test information 124.

When the security test information 124 is the encrypted value of the particular information, the reference information includes the public key. The terminal decrypts the security test information 124 using the prestored public key and determines whether the particular information is recovered. Alternatively, the terminal receives the public key over the mobile communication network of the wireless network provider, decrypts the security test information 124 using the public key, and determines whether the particular information is recovered. When the particular information is recovered, the terminal determines that the security is confirmed.

When the security test information 124 is the hash value, the reference information includes the input parameter for the hash value. The terminal generates the hash value using the prestored input parameter and determines whether the generated hash value matches the hash value of the security test information 124. Alternatively, the terminal receives the input parameter over the mobile communication network of the wireless network provider, generates the hash value using the input parameter, and determines whether the generated hash value matches the hash value of the security test information 124. When the two hash values are the same, the terminal determines that the security is verified. In so doing, at least one of a condition that the frame including the same hash value be received within a certain time after the input parameter is obtained and a condition that the AP be the first to transmit the frame including the same hash value can be added.

Although it is not illustrated in FIG. 5, after the security test, the terminal can inform the user of the security test result using a display means. Alternatively, the terminal can exclude the AP that is not proved to be safe from a list of the searched APs.

Figure 6:
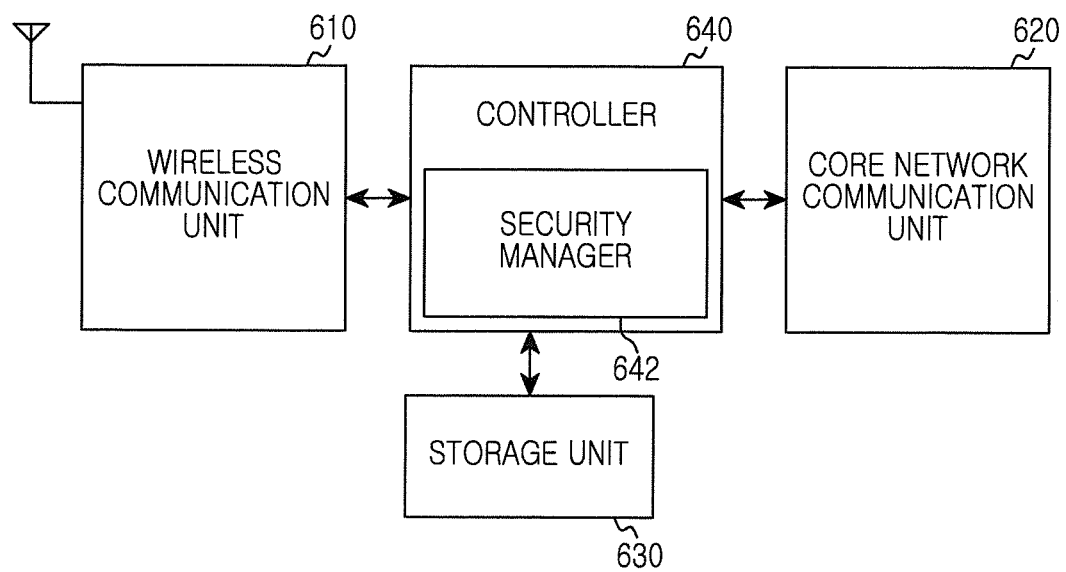
FIG. 6 illustrates the AP in the wireless communication system according to an exemplary embodiment of the present disclosure.

FIG. 6 is a block diagram of an AP in the wireless communication system according to an exemplary embodiment of the present disclosure.

Referring to FIG. 6, the AP includes a wireless communication unit 610, a core network communication unit 620, a storage unit 630, and a controller 640.

The wireless communication unit 610 provides an interface to communicate with a terminal over a radio channel. For example, the wireless communication unit 610 includes a modem and a Radio Frequency (RF) processor. The wireless communication unit 610 encodes and modulates transmit data, up-converts to an RF signal, and transmits the RF signal via an antenna. The wireless communication unit 610 down-converts a received RF signal to a baseband signal and demodulates and decodes the baseband signal. The core network communication unit 620 provides an interface to access a core network, for example, the Internet network. Through the core network communication unit 620, the AP can communicate with other entities connected to the core network. The storage unit 630 stores a basic program and setup information required for operation of the AP.

The controller 640 controls the functions of the AP. Particularly, the controller 640 includes a security manager 642 for verifying the security of the AP for the terminal. The security manager 642 can prove to the terminal that the wireless network provider corresponding to the AP is using the rightful network name and include security test information 124 in a frame transmitted by the AP. The operations of the controller 640 for the security test are described in detail.

The controller 640 determines whether to transmit a frame informing a terminal of the existence of the AP. The frame informing a terminal of the existence of the AP enables the terminal to obtain the basic information used for accessing the AP through the scanning procedure and indicates that the frame is receivable before the terminal completes its connection to the AP. For example, the frame informing the terminal of the AP existence includes the beacon frame and the probe response frame. When determining to transmit the frame informing the terminal of the AP existence, the controller 640 determines the security test information 124. For example, the security test information 124 can be one of the encrypted value of the particular information (e.g., BSSID) and the hash value generated from the input parameter (e.g., the system time and/or the random value) fed from the wireless network provider. When the security test information 124 is the encrypted value of the particular information, the controller 640 encrypts the particular information using the predefined private key. When the security test information 124 is the hash value, the controller 640 receives the input parameter from a separate server via the core network communication unit 620 and generates the hash value from the input parameter. Next, the controller 640 generates and transmits the frame including the security test information 124 via the wireless communication unit 610. According to an exemplary embodiment, the security test information 124 can be included in the vendor-specific 1E of the frame body. Alternatively, the security test information 124 can be included as a separate IE defined for the security test. In addition to the security test information 124, the network provider identification information 122 can be included.

Figure 7:
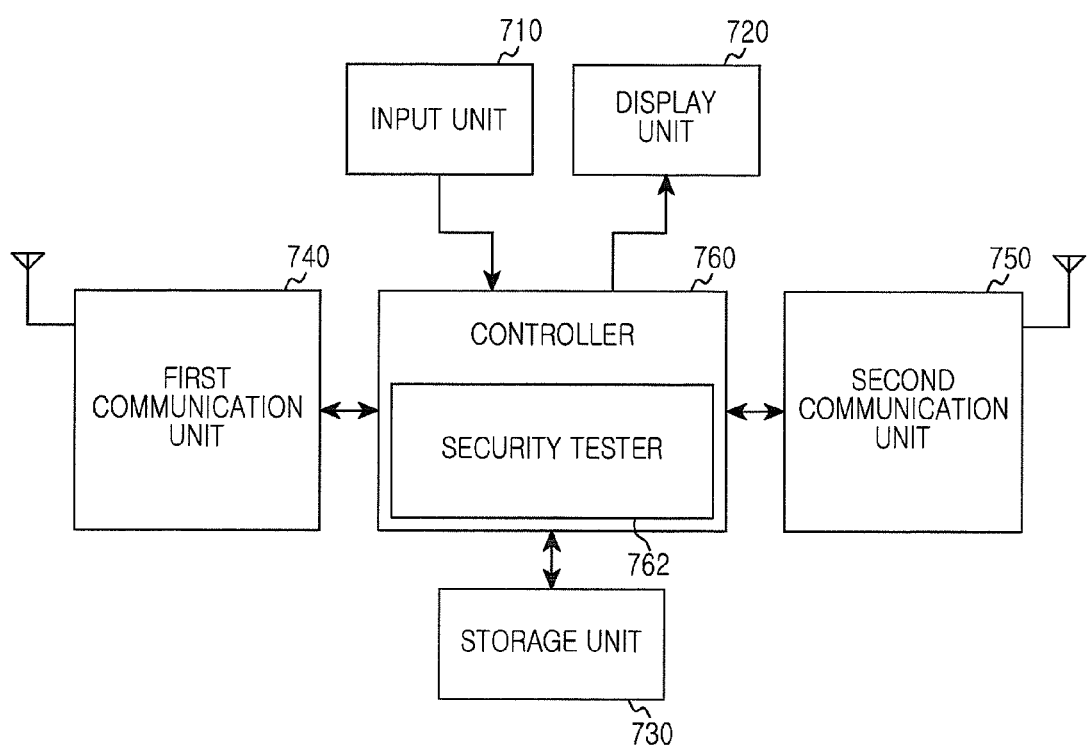
FIG. 7 illustrates the terminal in the wireless communication system according to an exemplary embodiment of the present disclosure.

FIG. 7 is a block diagram of a terminal in the wireless communication system according to an exemplary embodiment of the present disclosure.

Referring to FIG. 7, the terminal includes an input unit 710, a display unit 720, a storage unit 730, a first communication unit 740, a second communication unit 750, and a controller 760.

The input unit 710 recognizes the user's input and provides information corresponding to the input to the controller 760. That is, the input unit 710 processes the user's input through a keyboard, a keypad, a touch screen, a touch pad, a mouse, a special function button and/or the like. The display unit 720 displays state information during operation of the terminal, and numbers, characters, and images according to the execution of applications on the terminal. That is, the display unit 720 visually represents image data provided from the controller 760. For example, the display unit 720 can include a Liquid Crystal Display (LCD), a Light-Emitting Diode (LED), an Organic LED (OLED), and the like. The storage unit 730 can store a basic program for the operation of the terminal, one or more applications, user contents, setup information, and so on. The storage unit 730 provides the stored data in response to the request of the controller 760.

The first communication unit 740 provides an interface to access the mobile communication network. The second communication unit 750 provides an interface to access the wireless LAN. For example, the first communication unit 740 and the second communication unit 750 each include a modem and an RF processor. The first communication unit 740 processes the signal in conformity with the standard of the mobile communication network, and the second communication unit 750 processes the signal in conformity with the standard of the wireless LAN.

The controller 760 controls the functions of the terminal. Particularly, the controller 760 includes a security tester 762 for verifying the security of an AP. The security tester 762 extracts security test information 124 from a frame received from the AP and verifies the security of the AP using the security test information 124. The operations of the controller 760 for the security test are explained in detail.

When receiving the frame informing the terminal of the AP existence, the controller 760 extracts the security test information 124 from the received frame. The frame informing the terminal of the AP existence enables the terminal to obtain the basic information used for accessing the AP through the scanning procedure and indicates that the frame is receivable before the terminal completes its connection to the AP. For example, the frame informing the terminal of the AP existence includes the beacon frame and the probe response frame. For example, the security test information 124 can be one of the encrypted value of the particular information (e.g., BSSID) and the hash value generated from the input parameter (e.g., the system time and/or the random value) fed from the wireless network provider. The controller 760 tests the security using the security test information 124. For the security test, the controller 760 acquires additional reference information in addition to the security test information 124. The reference information can be stored in the manufacture phase of the terminal or received from the wireless network provider during operation.

When the security test information 124 is the encrypted value of the particular information, the reference information includes the public key. The controller 760 decrypts the security test information 124 using the prestored public key and determines whether the particular information is recovered. Alternatively, the controller 760 receives the public key over the mobile communication network of the wireless network provider, decrypts the security test information 124 using the public key, and determines whether the particular information is recovered. When the particular information is recovered, the controller 760 determines that the security is confirmed. When the security test information 124 is the hash value, the reference information includes the input parameter for the hash value. The controller 760 generates the hash value using the prestored input parameter and determines whether the generated hash value matches the hash value of the security test information 124. Alternatively, the controller 760 receives the input parameter over the mobile communication network of the wireless network provider, generates the hash value using the input parameter, and determines whether the generated hash value matches the hash value of the security test information 124. When the two hash values are the same, the controller 760 determines that the security of the AP is proved. In so doing, at least one of a condition that the frame including the same hash value be received within a certain time after the input parameter is obtained and a condition that the AP be the first to transmit the frame including the same hash value can be added.

After the security test, the controller 760 can inform the user of the security test result using the display unit 720. The controller 760 can exclude the AP that is not proved to be safe from a list of the searched APs displayed through the display unit 720.

In the wireless communication system, the wireless network provider can inform terminals that its wireless network is safe, and the user can determine whether the AP is safe prior to making a connection.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for operation of a terminal in a wireless communication system, the method comprising:
before completing connection to an Access Point (AP), receiving a frame that informs the terminal of existence of the AP over a first communication network;
extracting security test information from the frame;
identifying a reference information received over a second communication network, the reference information including a system time value; and
testing security of the AP using the security test information and the reference information, wherein the testing security of the AP comprises determining whether the frame is received within a predefined time starting from a time indicated by the system time value.

2. The method of claim 1, wherein the frame is one of a frame periodically broadcast by the AP and a frame transmitted by the AP in response to a request of the terminal.

3. The method of claim 1, wherein the frame is one of a beacon frame and a probe response frame.

4. The method of claim 1, wherein the testing security of the AP further comprises:
decrypting the security test information using the reference information; and
determining whether the decryption result matches predefined information.

5. The method of claim 4, wherein the reference information includes a public key for the decryption.

6. The method of claim 1, wherein the testing security of the AP further comprises:
generating a hash value using the reference information; and
determining whether the security test information comprises the hash value.

7. The method of claim 6, wherein the reference information further includes a random value.

8. The method of claim 1, wherein the second communication network includes a Radio Frequency Identification (RFID) tag.

9. The method of claim 1, wherein the second communication network is a mobile communication network.

10. The method of claim 6, wherein the testing security of the AP further comprises:
determining whether the AP is a first AP to transmit a frame comprising the hash value.

11. An apparatus of a terminal in a wireless communication system, comprising:
one or more transceivers configured to, before completing connection to an Access Point (AP), receive a frame that informs the terminal of existence of the AP over a first communication network; and receive reference information over a second communication network, the reference information including a system time value; and
a controller configured to extract security test information from the frame and test security of the AP using the security test information and the reference information and determine whether the frame comprising a hash value is received within a predefined time starting from a time indicated by the system time value.

12. The apparatus of claim 11, wherein the frame is one of a frame periodically broadcast by the AP and a frame transmitted by the AP in response to a request of the terminal.

13. The apparatus of claim 11, wherein the frame is one of a beacon frame and a probe response frame.

14. The apparatus of claim 11, wherein the controller is configured to test security of the AP by decrypting the security test information using the reference information and determining whether the decryption result matches predefined information.

15. The apparatus of claim 14, wherein the reference information includes a public key for the decryption.

16. The apparatus of claim 11, wherein the controller is configured to test security of the AP by generating the hash value using the reference information and determining whether the security test information comprises the hash value.

17. The apparatus of claim 16, wherein the reference information further includes a random value.

18. The apparatus of claim 11, wherein the second communication network includes a Radio Frequency Identification (RFID) tag.

19. The apparatus of claim 17, wherein the second communication network is a mobile communication network.

20. The apparatus of claim 16, wherein the controller is further configured to determine whether the AP is a first AP to transmit a frame comprising the hash value.

* * * * *